United States Patent
Sakai et al.

(10) Patent No.: US 10,663,584 B2
(45) Date of Patent: May 26, 2020

(54) PUBLISHING LIDAR CLUSTER DATA

(71) Applicant: Toyota Motor Engineering & Manufacturing North America, Inc., Erlanger, KY (US)

(72) Inventors: Katsuhiro Sakai, Ann Arbor, MI (US); Nobuhide Kamata, Ann Arbor, MI (US); Michael J. Delp, Ann Arbor, MI (US); Michael R. James, Northville, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 378 days.

(21) Appl. No.: 15/606,573

(22) Filed: May 26, 2017

(65) Prior Publication Data

US 2018/0341019 A1    Nov. 29, 2018

(51) Int. Cl.

| | |
|---|---|
| *G01S 17/08* | (2006.01) |
| *G01S 17/93* | (2020.01) |
| *G01S 17/89* | (2020.01) |
| *G01S 17/42* | (2006.01) |
| *G01S 17/66* | (2006.01) |
| *G01S 7/48* | (2006.01) |
| *G01S 7/00* | (2006.01) |

(52) U.S. Cl.
CPC .............. *G01S 17/08* (2013.01); *G01S 7/003* (2013.01); *G01S 7/4808* (2013.01); *G01S 17/42* (2013.01); *G01S 17/66* (2013.01); *G01S 17/89* (2013.01); *G01S 17/936* (2013.01); *B60Y 2400/301* (2013.01)

(58) Field of Classification Search
CPC ........ G01S 7/4808; G01S 7/003; G01S 17/08; G01S 17/10; G01S 17/42; G01S 17/66; G01S 17/89; G01S 17/936

See application file for complete search history.

(56) References Cited

U.S. PATENT DOCUMENTS

| | | | |
|---|---|---|---|
| 7,969,558 | B2 | 6/2011 | Hall |
| 9,904,375 | B1* | 2/2018 | Donnelly ............. G06F 3/0346 |
| 2006/0023917 | A1 | 2/2006 | Dickmann et al. |
| 2009/0303026 | A1* | 12/2009 | Broggi ................. G01S 17/023 340/435 |
| 2016/0054452 | A1* | 2/2016 | Cosatto ................... G01S 19/51 701/412 |

(Continued)

OTHER PUBLICATIONS

Shackleton et al. "Tracking People with a 360-Degree Lidar", 7th IEEE International Conference on Advanced Video and Signal Based Surveillance (2010).*

(Continued)

*Primary Examiner* — Eric L Bolda
(74) *Attorney, Agent, or Firm* — Christopher G. Darrow; Darrow Mustafa PC

(57) ABSTRACT

Systems and methods for publishing LIDAR cluster data are described. The vehicle can identify one or more clusters based on data from the LIDAR sensor. The identified one or more clusters can be representative of at least one object in an external environment of the vehicle. Additionally, the vehicle can publish the identified one or more clusters before the LIDAR sensor completes a full 360 degree rotation about the axis of rotation.

18 Claims, 6 Drawing Sheets

(56) References Cited

U.S. PATENT DOCUMENTS

2019/0025411 A1* 1/2019 Kuroda .................. G01S 17/89
2019/0155741 A1* 5/2019 Linke ..................... G06F 12/10

OTHER PUBLICATIONS

Steinhauser et al. "Motion segmentation and scene classification from 3D LIDAR data", 2008 IEEE Intelligent Vehicles Symposium, Jun. 4-6, 2008.*

Mendes et al. "Multi-target detection and tracking with a laser scanner", 2004 IEEE Intelligent Vehicles Symposium, Jun. 14-17, 2004.*

Chong et al., "Mapping with Synthetic 2D LIDAR in 3D Urban Environment", pp. 4715-4720, 2013 IEEE/RSJ International Conference on Intelligent Robots and Systems (IROS) Nov. 3-7, 2013. Tokyo, Japan.

* cited by examiner

PUBLISHING LIDAR CLUSTER DATA

TECHNICAL FIELD

The subject matter described herein relates in general to LIDAR sensors and, more particularly, to publishing of LIDAR cluster data.

BACKGROUND

Light Detection and Ranging (LIDAR) sensors are becoming more popular in vehicle sensor systems. Some LIDAR sensors, such as those made by Velodyne, rotate so as to capture data in 360° around a vehicle. The data is then used to form 3D point clouds representing the vehicle's environment. Some vehicles use LIDAR sensors for object detection and/or tracking.

SUMMARY

One example can include a system for publishing cluster data in a vehicle. The system can include a LIDAR sensor configured to rotate 360 degrees about an axis of rotation. The system can also include one or more processors operatively connected to the LIDAR sensor. The system can also include memory operatively connected to the one or more processors. The memory can store instructions that, when executed by the one or more processors, cause the one or more processors to identify one or more clusters based on data received from the LIDAR sensor, the identified one or more clusters being representative of at least one object in an external environment of the vehicle. The memory can also store instructions publish the identified one or more clusters before the LIDAR sensor completes a full 360 degree rotation about the axis of rotation.

Another example can include a system for publishing cluster data in a vehicle. The system can include a LIDAR sensor rotating about an axis of rotation, the LIDAR sensor transmitting a signal and generating data responsive to detecting the transmitted signal reflected off a surface. The system can also include one or more processors communicably coupled to the LIDAR sensor. The system can also include memory communicably coupled to the one or more processors. The memory can store instructions that, when executed by the one or more processors, cause the one or more processors to receive point cloud data generated by the LIDAR sensor as the LIDAR sensor is rotating. The memory can also include instructions to identify one or more clusters in the point cloud data, the identified one or more clusters being representative of at least one object in an external environment of the vehicle. The memory can also include instructions to identify a perceived end of a first cluster of the one or more clusters. The memory can also include instructions to determine whether data from any of the one or more clusters is present within a threshold discontinuity interval following the perceived end of the first cluster as subsequent point cloud data is received. The memory can also include instructions to publish at least the first cluster if no data from the one or more clusters is present within the threshold discontinuity interval. The memory can also include instructions to refrain from publishing at least the first cluster if data from the one or more clusters is present within the threshold discontinuity interval.

Another example can include a method of publishing cluster data in a vehicle. The method can include identifying one or more clusters based on data from a LIDAR sensor as the LIDAR sensor rotates about an axis of rotation, the identified one or more clusters being representative of at least one object in an external environment of the vehicle. The method can also include publishing the identified one or more clusters before the LIDAR sensor completes a full 360 degree rotation about the axis of rotation.

DETAILED DESCRIPTION

Systems and methods for publishing cluster data from a point cloud in a vehicle are described. The vehicle can receive data generated by a LIDAR sensor as the LIDAR sensor is rotating about an axis of rotation. The vehicle can identify clusters in the point cloud data. The clusters may be representative of object(s) surrounding the vehicle. However, depending on the location and/or speed of the object and the speed at which the sensor is rotating, some issues can occur. For example, typical systems only begin analysis on the 3D point cloud data after the completion of a full 360° rotation of the LIDAR sensor. While some models of various rotating LIDAR sensors rotate from two-ten hertz, data is still refreshed for the 3D point cloud relatively slowly and, therefore, analyzed slowly. Further, where an object is partially located at the beginning of the full 360° rotation, the object can move substantially over the duration of the rotation. This can result in distortion of a representation of the object upon the LIDAR sensor returning to the object upon completion of the full 360° rotation. At times, an object tracking and/or clustering module of the vehicle may interpret the object as being two separate objects based on this distortion. Therefore, the vehicle can publish the identified one or more clusters before the LIDAR sensor completes a full 360 degree rotation about the axis of rotation. The disclosed systems and methods can expedite the publishing of cluster data, as well as eliminate or mitigate the likelihood of distortion of the LIDAR cluster data.

Figure 1:
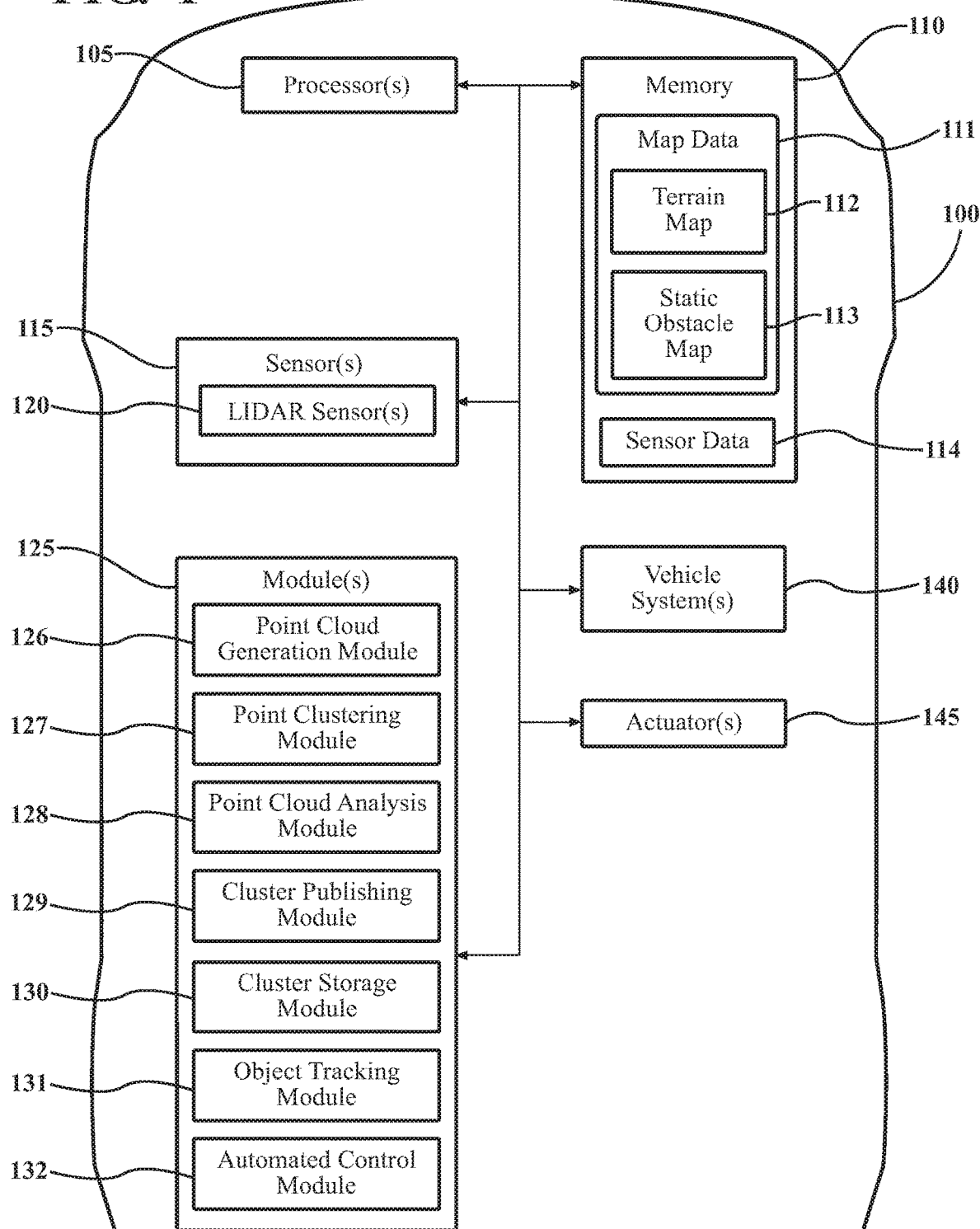
FIG. 1 is a block diagram of a vehicle.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that examples are not limited to automobiles. The vehicle 100 can be configured to monitor an environment external to the vehicle 100.

In one or more examples, the vehicle 100 can be a manual and/or an autonomous vehicle. As used herein, "manual vehicle" refers to a vehicle that is navigating and/or maneuvering according to the input from a human driver. Additionally, as used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more examples, the vehicle 100 is highly automated or completely automated. In one example, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a path. In one or more arrangements, the vehicle 100 is configured to operate in one or more semi-autonomous operational modes in which one or more computing systems control one or more components of the vehicle 100 to cause the vehicle 100 to follow a modified path deviating from the current path being followed by the vehicle operator. In this example, the one or more computing systems control one or more components of the vehicle 100 to cause the vehicle 100 to follow a modified path responsive to determining a deviation from the current path being followed by the vehicle operator.

The vehicle 100 includes various elements. It will be understood that, in various examples, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. Further, while the various elements are shown as being located within the vehicle 100 in FIG. 1, it will be understood that one or more of these elements can be located external to the vehicle 100. Further, the elements shown may be physically separated by large distances.

The vehicle 100 includes one or more processor(s) 105. The processor(s) 105 are configured to implement or perform various functions described herein. In one or more arrangements, the processor(s) 105 can be a main processor of the vehicle 100. For instance, the processor(s) 105 can be an electronic control unit (ECU). The vehicle 100 can include memory 110 for storing one or more types of data. The memory 110 can include volatile and/or non-volatile memory. Examples of suitable memory include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The memory 110 can be a component of the processor(s) 105, or the memory 110 can be operatively connected to the processor(s) 105 for use thereby. The term "operatively connected," as used throughout this description, can include direct or indirect connections, including connections without direct physical contact.

The memory 110 can include map data 111. The map data 111 can include maps of one or more geographic areas (including a current location of the vehicle 100). In some instances, the map data 111 can include information or data on roads, traffic control devices, road markings, structures, features, and/or landmarks in the one or more geographic areas. The map data 111 can be in any suitable form. In some instances, the map data 111 can include aerial views of an area. In some instances, the map data 111 can include ground views of an area, including 360-degree ground views. The map data 111 can include measurements, dimensions, distances, and/or information for one or more items included in the map data 111 and/or relative to other items included in the map data 111. The map data 111 can include a digital map with information about road geometry. The map data 111 can be high quality and/or highly detailed. In one or more arrangements, the map data 111 can be formatted to be compatible to the point cloud data (e.g., data points representative of the current environment).

In one or more arrangements, the map data 111 can include one or more terrain maps 112. The terrain map(s) 112 can include information about the ground, terrain, roads, surfaces, and/or other features of one or more geographic areas. The terrain map(s) 112 can include elevation data in the one or more geographic areas. The map data 111 can be high quality and/or highly detailed. The terrain map(s) 112 can define one or more ground surfaces, which can include paved roads, unpaved roads, land, and other things that define a ground surface.

In one or more arrangement, the map data 111 can include one or more static obstacle maps 113. The static obstacle map(s) 113 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 113 can have location data, size data, dimension data, material data, and/or other data associated with it. The static obstacle map(s) 113 can include measurements, dimensions, distances, and/or information for one or more static obstacles. The static obstacle map(s) 113 can be high quality and/or highly detailed. The static obstacle map(s) 113 can be updated to reflect changes within a mapped area.

The vehicle 100 can include one or more sensors 115. "Sensor" means any device, component and/or system that can detect, acquire, and/or sense something. The one or more sensors can be configured to detect, acquire, and/or sense in real-time. As used herein, the term "real-time" means a level of processing responsiveness that a user or system senses as sufficiently immediate for a particular process or determination to be made, or that enables the processor to keep up with some external process.

In arrangements where the vehicle 100 includes a plurality of sensors, the sensors can work independently from each other. Alternatively, two or more of the sensors can work in combination with each other. In such case, the two or more sensors can form a sensor network. The sensor(s) 120 can be operatively connected to the processor(s) 105, the memory 110, and/or other elements of the vehicle 100 (including any of the elements shown in FIG. 1).

Figure 2:
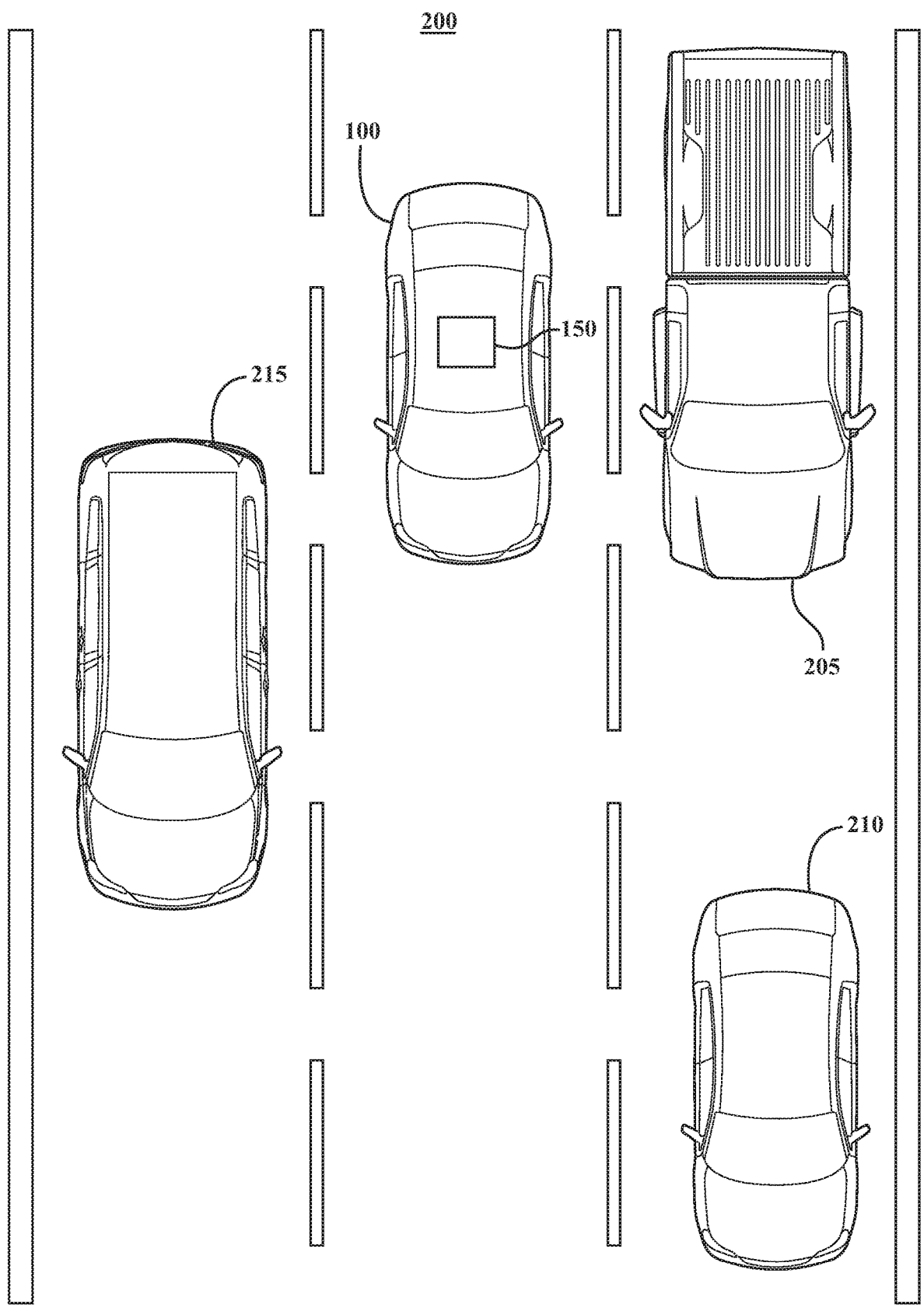
FIG. 2 is an example of an environment within which the vehicle of FIG. 1 may operate.

Referring now to FIG. 1 and FIG. 2, an example of an environment 200 which the vehicle 100 can be operating in is shown. As shown in FIG. 2, there are a plurality of objects located in the environment 200 of the vehicle 100 including a first vehicle 205, a second vehicle 210, and a third vehicle 215.

In one or more arrangements, the one or more sensors 115 can include one or more Light Detection and Ranging (LIDAR) sensors 120. The LIDAR sensor(s) 120 can include one or more transmitters. The one or more transmitters can be configured to transmit one or more signals. The one or more signals can in some examples be light (e.g., laser) wave(s). In some examples, the one or more transmitters can be configured to transmit a plurality of signals. In these examples, the one or more transmitters can transmit the plurality of signals at the same or substantially the same time. In this regard, the LIDAR sensor(s) 120 can be configured to transmit signals to a portion of the environment at the same or substantially the same time. The portion can be defined at least in part by a dispersion angle of the LIDAR sensor(s) 120. As used herein, "dispersion angle" includes an angle between the outermost transmitted signals of the plurality of signals transmitted at the same or substantially the same time. In some examples, the dispersion angle for the LIDAR sensor 120 can be approximately 3°. However, in some arrangements, the dispersion angle can be greater than or less than 3°.

The LIDAR sensor(s) 120 can include one or more receivers. The one or more receivers can be configured to detect the transmitted signal responsive to the signal reflecting off a surface. Using the received signals, the LIDAR sensor 120 and/or one of more processors 105 can generate data corresponding to a distance to the surface that the signal was reflected off. In the example depicted in FIG. 2, the LIDAR sensor 120 can transmit signals into the external environment 200. Some signals transmitted from the LIDAR, sensor 120 can be reflected off the terrain and detected or received by the one or more receivers of the LIDAR sensor(s) 120. Additionally, some signals transmitted from the LIDAR sensor 120 can be reflected off objects in the external environment (e.g., each of the vehicles 205, 210, 215). Each of the signals detected by the receiver can be converted to data points corresponding to a distance to the surface (e.g., terrain, vehicles 205, 210, 215, etc.) that the signal was reflected off of.

The LIDAR sensor 120 can be configured to rotate about an axis of rotation. In some examples, the LIDAR sensor 120 can be mounted on a roof of the vehicle 100, and can be configured to rotate 360°. In this regard, the LIDAR sensor 120 can capture data surrounding the vehicle 100. In one or more arrangements, the LIDAR sensor can be configured to continuously rotate about the axis of rotation.

In one or more arrangements, the LIDAR sensor(s) 120 can be configured to rotate at a substantially constant speed. In this example, the speed can be, for example, from about two hertz to about ten hertz. However, the speed can be outside of this range. In some arrangements, the LIDAR sensor(s) 120 can be configured to rotate at variable speeds. For example, the LIDAR sensor(s) 120 can be configured to change its rotational speed depending on one or more different variables including, but not limited to, number of objects in the environment, distance to the objects in the environment, availability of other sensors, etc. Additionally, the LIDAR sensor(s) 120 can be configured to rotate in a clockwise direction and/or a counterclockwise direction. The LIDAR sensor(s) 120 can transmit signals in a single plane or in a plurality of planes.

An example of such a rotating LIDAR sensor 20 includes LIDAR sensors available from Velodyne LiDAR, Inc., Morgan Hill, Calif.

In one or more arrangements, the signals acquired by the LIDAR sensor 120 can be used to generate a three dimensional point cloud. The points in the point cloud can correspond to signals that were detected by the LIDAR sensor 120. Each of the points in the point cloud can have an associated a distance between a surface that a signal was reflected off of and the LIDAR sensor 120. Each of the points in the point cloud can have an associated orientation in three dimensions relative to the LIDAR sensor 120. In some examples, some portions of the point cloud can represent the ground surface (e.g., the terrain). In some examples, some portions of the point cloud can represent one or more objects (e.g., vehicles 205, 210, 215) located in the environment of the vehicle 100.

Figure 3:
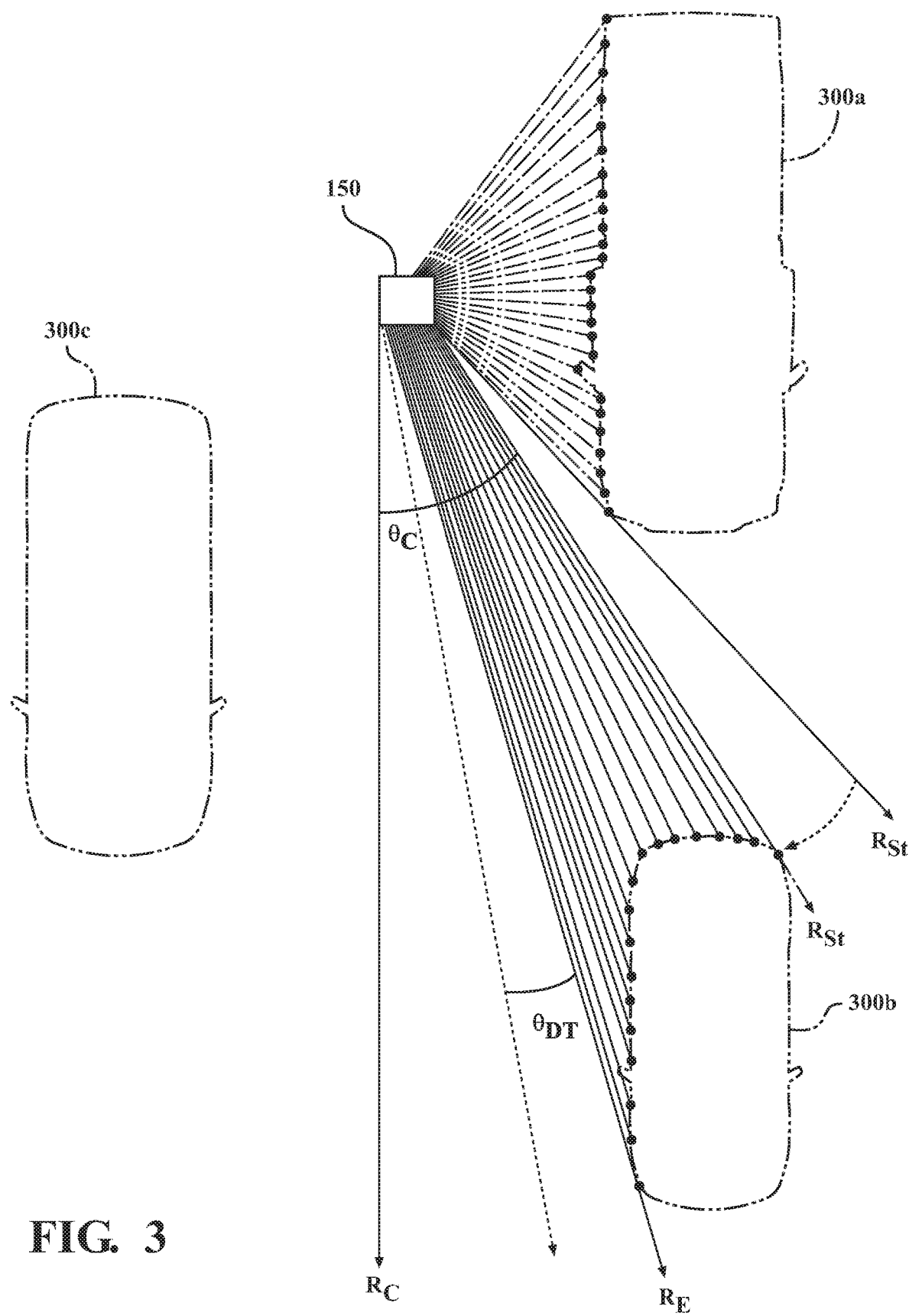
FIG. 3 is an example of a point cloud representative of the environment of FIG. 2.

Referring now to FIG. 3, an example of a point cloud representation of the external environment of the vehicle 100 is shown. The point cloud can correspond to the environment shown in FIG. 2. It should be understood that the representation in FIG. 3 has already gone through much of the pre-processing steps (e.g., filtering, clustering, etc.), which will be discussed in greater detail below, for purposes of clarity. However, the actual point cloud would include significantly more data points, including those from the terrain, surrounding structures, etc.

In one or more arrangements, the vehicle 100 can include one or more modules 125. Modules can be or include computer-readable instructions that, when executed by the processor(s) 105, cause the processor(s) 105 to perform the various functions disclosed herein. While the modules 125 will be described herein with reference to functions for purposes of brevity, it should be understood that the modules 125 include instructions that cause the processor(s) 105 to perform the described functions. Also, it should be understood that, although shown as separate from the memory 110, the modules 125 can be stored in memory 110. Further, the various modules can be remotely stored and accessible by the processor(s) 105. Additionally, although the components described herein (e.g., processor(s) 105, memory 110, modules 125) are shown as components of the vehicle 100, it should be noted that one or more of the components could be included or otherwise incorporated into a single component, such as the LIDAR sensor 120.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include a point cloud generation module 126. The point cloud generation module 126 can generate one or more point clouds based on the signals acquired by the LIDAR sensor 120. The point cloud generation module 126 can receive data from the LIDAR sensor 120 corresponding to the acquired signals. The point cloud generation module 126 can compile data from the LIDAR sensor 120 in real-time as the LIDAR sensor 120 rotates. The point cloud generation module 126 can construct a representation of the environment 200 based on the measured points from the LIDAR sensor 120. In this regard, the measured data points can include those from the ground surface (e.g., the terrain), objects (e.g., vehicles 205, 210, 215), surrounding structures and static obstacles. Therefore, the point cloud generation module 126 can generate a three-dimensional (3D) point cloud that represents the current environment of the vehicle 100, including a plurality of objects located therein.

The vehicle 100 can include a point clustering module 127. In some arrangements, the point clustering module 127 can filter data in the generated point cloud. In one or more arrangements, the point clustering module 127 can access data stored on memory 110. For example, the point clustering module 127 can access the terrain map(s) and/or the static obstacle map(s). The point clustering module 127 can compare the point cloud generated by the point cloud generation module 126 to the map data 111 stored on memory 110. The point clustering module 127 can remove data points from the generated point cloud that represent the terrain (via the terrain map(s) 112) and/or static obstacles (via the static obstacle map(s) 113). In this regard, the remaining data in the point cloud constructed by the point cloud generation module 126 would represent one or more dynamic objects in the environment of the vehicle 100.

The point clustering module 127 can group data into clusters. The clusters can be grouped such that similar data from at least one object (including but not limited to the same object) are grouped together. In one or more arrangements, the clusters can be representative of objects in the environment of the vehicle 100, with data from a single cluster being grouped together that is reflected off the same object. In some examples, however, two or more objects may be in close proximity to one another such that data from the two or more objects may be represented by the same cluster. In other examples, the same object may have some internal gaps (e.g., a semi-truck and the attached trailer), such that the two clusters may represent data from the same object. Data grouping (e.g., clustering) can be performed using various techniques, such as spatial clustering algorithms, point density clustering algorithms, or any other clustering algorithms currently known or later developed in the art.

In the example shown in FIG. 3, the point clustering module 127 can generate clusters 300*a*, 300*b*, 300*c* corresponding to the vehicles 205, 210, 215, respectively, in the environment 200 of the vehicle 100.

The vehicle 100 can include a point cloud analysis module 128. The point cloud analysis module 128 can determine whether a discontinuity exists following each of the clusters. Discontinuity, as used herein, includes an absence of data following an end of a cluster for an interval. The discontinuity may be indicative of a gap following an object. If a discontinuity is detected, the vehicle 100 can have sufficient processing time to publish data for one or more clusters (as will be discussed below); and furthermore, the vehicle 100 can be sufficiently certain that the clusters are complete (e.g., a complete representation of a respective object). Publish, as used herein, means the distribution, transmission, or otherwise making available data from one place (e.g., system, component, device, source, and/or location) to another place.

The point cloud analysis module 128 can identify one or more clusters to be published before the LIDAR sensor 150 completes a full 360 rotation. For purposes of clarity and to aid in the identification of specific portions of a point cloud, the following description uses rays, angles, etc. It should be understood that the rays, angles, etc. described herein are one example of implementing the systems and methods described herein. There are other examples that may be used to implement the systems and methods described herein, and therefore the claims should not be limited to the provided examples.

The point cloud analysis module 128 can begin analysis at a starting ray $R_{St}$ and move in a clockwise-direction (as shown in FIG. 3). Although described as a clockwise-direction, it should be understood that the point cloud analysis module 128 can analyze data from the point cloud in a counterclockwise-direction. However, the point cloud analysis module 128 should analyze data from the point cloud along the same direction as the direction of rotation of the LIDAR sensor 120.

In one or more arrangements, the starting ray $R_{St}$ can be a ray in the point cloud following a previously-published cluster. In this example, the cluster 300*a* associated with vehicle 205 is assumed to have been previously published. When a cluster 300*a* is published, an end of the cluster 300*a* may be designated as the starting ray $R_R$. In one or more arrangements, the starting ray $R_{St}$ may be an initiation position (e.g., when the LIDAR sensor 120 is activated).

The point cloud analysis module 128 can analyze the point cloud(s) from the starting ray $R_{St}$ up to a current ray $R_C$. The current ray $R_C$ may be an imaginary ray extending from an origin and through a furthest detected point along the direction of rotation in the point cloud. In one or more arrangements, the current ray $R_C$ can move as subsequent point cloud data is received. The angle between the starting ray $R_{St}$ and the current ray $R_C$ will be referred to herein as the current angle $\theta_C$. As will be discussed in greater detail below, the current angle $\theta_C$ can be compared to a threshold publishing angle $\theta_{PT}$. Responsive to the current angle $\theta_C$ being greater than the threshold angle $\theta_{PT}$, the vehicle 100 can automatically publish one or more clusters detected within the current angle $\theta_C$.

In the example shown in FIG. 3, moving clockwise from the starting ray $R_{St}$, the point cloud analysis module 128 can identify a start of new cluster (e.g., cluster 300*b*). In some instances, the point cloud analysis module 128 can move the starting ray $R_{St}$ from its previous position at the end of a previously-published cluster (e.g., cluster 300*a*) to the start of a new cluster (e.g., cluster 300*b*). As such, the current angle $\theta_C$ can be measured between the start of cluster 300*b* to the current ray $R_C$.

The point cloud analysis module 128 can continue to move clockwise from the starting ray $R_{St}$ along the cluster 300*b* until it reaches an end of the cluster 300*b*. The end of the cluster 300*b* can be used for determining whether a discontinuity exists.

To determine whether a discontinuity exists, the point cloud analysis module 128 can identify a perceived end of the cluster 300*b*. The perceived end of a cluster can be an outermost point in the cluster along the direction of rotation that is interpreted as being the end of the cluster. Therefore, the perceived end of the cluster 300*b* may be what the point cloud analysis module 128 initially identifies as the end of the cluster 300*b*. In some examples, the perceived end may be the actual end of the cluster 300*b*. In some examples, the perceived end may not be the actual end of the cluster 300*b*, and one or more points from the cluster 300*b* may exist beyond the perceived end.

The point cloud analysis module 128 can mark the perceived end of the cluster 300*b* with an end ray $R_E$. The point cloud analysis module 128 can continue to move the current ray $R_C$ in a clockwise direction as additional point cloud data is received following the perceived end of the cluster 300*b*. The point cloud analysis module 128 can monitor an interval beyond the end ray $R_E$, referred to herein as a threshold discontinuity interval, as subsequent point cloud data is received. The threshold discontinuity interval, as used herein, includes any threshold interval, and can be measured by a space, a duration of time, a degree of rotation, etc. The example shown in FIG. 3 and used herein is a threshold discontinuity angle $\theta_{DT}$, however, any interval would be sufficient.

The threshold discontinuity angle $\theta_{DT}$ can be a fixed angle (e.g., 3°, 5°, 10°, etc.), an angle that is a function of a distance between the perceived end of a cluster and the LIDAR sensor, etc. When the size of the threshold discontinuity angle $\theta_{DT}$ is a function of the distance between the perceived end of the cluster and the LIDAR sensor, the threshold discontinuity angle $\theta_{DT}$ can decrease as the distance to the perceived end of the cluster increases. Therefore, in one or more arrangements, the threshold discontinuity angle $\theta_{DT}$ used for one cluster (e.g., cluster 300*b*) may not be the same as the threshold discontinuity angle $\theta_{DT}$ used for other clusters (e.g., cluster 300a and/or cluster 300c).

The threshold discontinuity angle $\theta_{DT}$ can be used to determine whether a discontinuity exists, which, in turn, can be used to determine whether to publish one or more clusters. The threshold discontinuity angle $\theta_{DT}$ can be analyzed to determine whether any points are contained therein. If no points from any of the clusters (including but not limited to the cluster 300b) are detected within the threshold discontinuity angle $\theta_{DT}$ following the perceived end of the cluster 300b, the point cloud analysis module 128 can determine that a discontinuity exists and that the vehicle 100 can publish one or more clusters from the current angle $\theta_C$. If, however, one or more points from any of the clusters are detected within the threshold discontinuity angle $\theta_{DT}$, the point cloud analysis module 128 can determine that there is an insufficient discontinuity (or no discontinuity), and the vehicle 100 can continue to analyze clusters as they are formed when subsequent data point cloud data is received.

As shown in the example in FIG. 3, no points from the point cloud are located within the threshold discontinuity angle $\theta_{DT}$ following the perceived end of the cluster 300b and, therefore, the cluster 300b can be published. After the publication of a cluster, the point cloud analysis module 128 can move the starting ray $R_{St}$ up to the current position of the end ray $R_E$ for the published point cloud.

The vehicle 100 can include a cluster publishing module 129. The cluster publishing module 129 can publish one or more clusters from within the current angle $\theta_C$ of the point cloud to various other components of the system. The cluster publishing module 129 can publish an identification of the clusters from within the current angle $\theta_C$, data from each of the clusters, a location of each of the clusters, a size of each of the clusters, etc. In the example shown in FIG. 3 and as previously discussed, since no points from the point cloud are located within the threshold discontinuity angle $\theta_{DT}$ following the perceived end of the cluster 300b, the cluster publishing module 129 can publish, at least, the cluster 300b to various components. As will be discussed in greater detail below, in some arrangements, the cluster publishing module 129 can publish the cluster 300b to an object tracking module 131 for purposes of tracking the object associated with the cluster 300b (e.g., vehicle 210). In other examples, the various clusters, including cluster 300b, can be communicated to other various components depending on needs, arrangements, etc.

Following the publishing of the cluster 300b, the point cloud analysis module 128 can continue its analysis in the direction of rotation along the point cloud. In this example, the point cloud analysis module 128 can detect the third cluster 300c, and it can perform the same steps on the third cluster 300c to determine whether the third cluster 300c should be published. The perception and publishing system as described herein can expedite publishing of point cloud data by publishing point cloud data on a rolling basis, rather than waiting for a full 360° rotation to publish the point cloud data.

The vehicle 100 can include an object tracking module 131. In one or more arrangements, the object tracking module 131 can include instructions for tracking an object associated with the published cluster data. Tracking, as used herein, can include monitoring the location, velocity, etc. of another object over time. In one or more arrangements, the cluster publishing module 129 can publish the cluster data to the object tracking module 131. In some examples, the object tracking module 131 can track the object as the LIDAR sensor(s) 120 complete subsequent 360° rotations. In this regard, the object tracking module 131 tracks the associated objects over time.

In one or more arrangements, the vehicle 100 can include an automated control module 132. In one or more arrangements, the automated control module 132 can determine one or more maneuvers and/or one or more paths to follow based on the tracked object. In some examples, the automated control module 132 can generate one or more signals to cause the vehicle 100 to execute the maneuver(s) and/or follow the path(s).

The vehicle 100 can include one or more vehicle systems 140. In some examples, the vehicle 100 can include a propulsion system, a braking system, a steering system, throttle system, a transmission system, a signaling system, and/or a navigation system. Each of these systems can include one or more devices, components, and/or combination thereof, now known or later developed. Various examples of the one or more vehicle systems 140 are described herein; however, the vehicle 100 can include more, fewer, or different vehicle systems. It should be appreciated that although particular vehicle systems are separately defined, each or any of the systems or portions thereof can be otherwise combined or segregated via hardware and/or software within the vehicle 100.

The automated control module(s) 132 can communicate with the various vehicle systems 140. In one or more arrangements, the processor(s) 105 and/or automated control module(s) 132 can be operatively connected to communicate with the various vehicle systems 140 and/or individual components thereof.

The processor(s) 105 and/or the automated control module(s) 132 can control the navigation and/or maneuvering of the vehicle 100 by controlling one or more of the vehicle systems 140 and/or components thereof. For instance, when operating in an autonomous or semi-autonomous mode, the processor(s) 105 and/or the automated control module(s) 132 can control the direction and/or speed of the vehicle 100. The processor(s) 105 and/or the automated control module(s) 132 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action can occur, either in a direct or indirect manner.

The vehicle 100 can include one or more actuators 145. The actuators 145 can be any element or combination of elements operable to modify, adjust and/or alter one or more of the vehicle systems 140 or components thereof responsive to receiving signals or other inputs from the processor(s) 105 and/or the automated control module(s) 132. Any suitable actuator can be used. For instance, the one or more actuators 145 can include motors, pneumatic actuators, hydraulic pistons, relays, solenoids, and/or piezoelectric actuators, just to name a few possibilities.

The automated control module(s) 132 can receive, and/or determine location information for objects (e.g., objects being tracked by the object tracking module 131) within the external environment 200 of the vehicle 100 for use by the processor(s) 105, and/or one or more of the modules 125. The automated control module(s) 132 can determine path(s), current autonomous driving maneuvers for the vehicle 100, future autonomous driving maneuvers and/or modifications to current autonomous driving maneuvers based on data acquired by the sensor system 115, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities.

The automated control module(s) 132 can be configured can implement the determined driving maneuvers. The automated control module(s) 132 can cause, directly or indirectly, such autonomous driving maneuvers to be implemented. As used herein, "cause" or "causing" means to make, command, instruct, and/or enable an event or action to occur or at least be in a state where such event or action can occur, either in a direct or indirect manner. The automated control module(s) 132 can execute various vehicle functions and/or to transmit data to, receive data from, interact with, and/or control the vehicle 100 or one or more systems thereof (e.g. one or more of vehicle systems 140).

Figure 4:
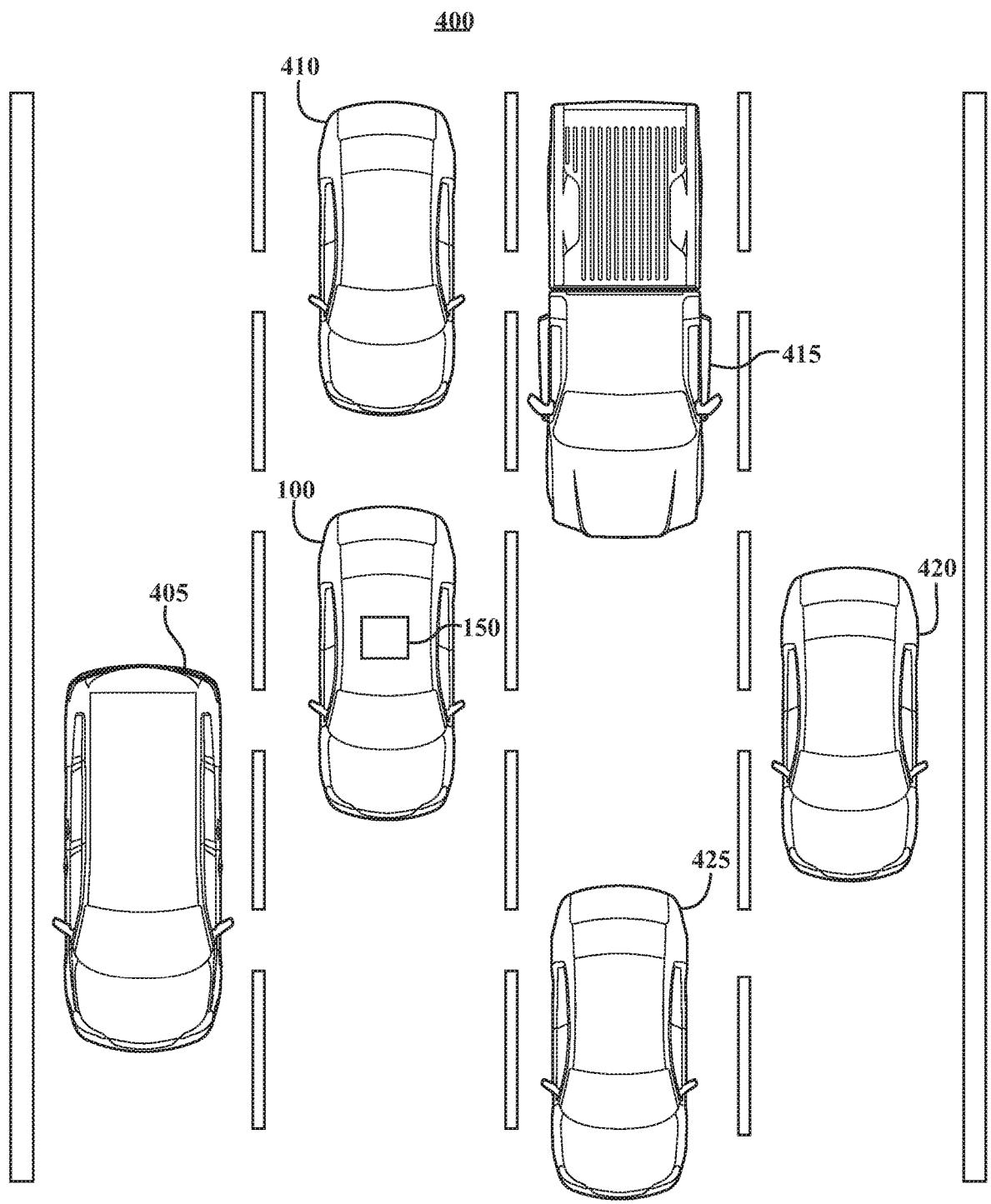
FIG. 4 is another example of an environment within which the vehicle of FIG. 1 may operate.
Figure 5:
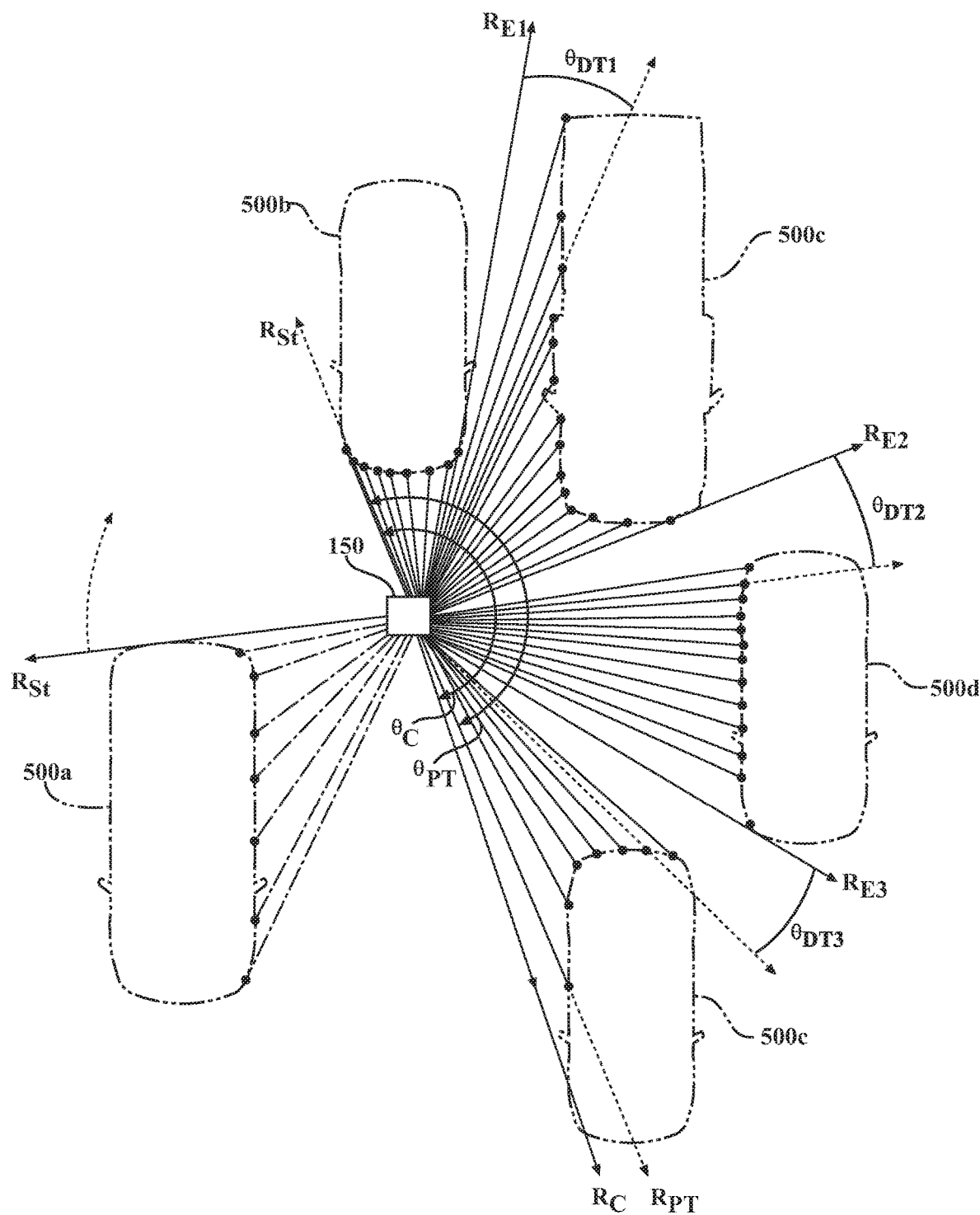
FIG. 5 is an example of a point cloud representative of the environment of FIG. 4.

Referring now to FIG. 4 and FIG. 5, another example environment 400 within which the current systems and methods can operate is shown, along with the corresponding point cloud in FIG. 5. The vehicle 100 is in congested traffic in the environment 400 shown in FIG. 4. The environment 400 of the vehicle 100 includes five vehicles (e.g., vehicles 405, 410, 415, 420, 425). Similar to the example described with reference to FIG. 2, the vehicle 100 can generate a point cloud representative of the environment as the LIDAR sensor 120 is rotated about the axis of rotation. An example of the point cloud corresponding to the environment 400 is shown in FIG. 5.

In the example shown in FIG. 5, a cluster 500a, which corresponds to vehicle 405, is assumed to have been previously published, such that the starting ray $R_{St}$ is positioned at an end of the cluster 500a representing the vehicle 405. As shown, the current ray $R_C$ continues from the starting ray $R_{St}$ in the clockwise direction. The current angle $\theta_C$ can be measured between the starting ray $R_{St}$ and the current ray $R_C$. As additional point cloud data is received, the point cloud analysis module 128 can identify a start of a next cluster 500b corresponding to the second vehicle 410. In some arrangements, the point cloud analysis module 128 can move the starting ray $R_{St}$ from its previous position at the end of the previously-published cluster 500a to the start of cluster 500b. As such, the current angle $\theta_C$ can be measured between the start of cluster 500b to the current ray $R_C$.

As subsequent point cloud data is received, the point cloud analysis module 128 can identify and mark the perceived end of the cluster 500b with an end ray $R_{E1}$. The point cloud analysis module 128 can continue to move the current ray $R_C$ in a clockwise direction past the end ray $R_{E1}$ as additional point cloud data is received. The point cloud analysis module 128 can monitor data following the end ray $R_{E1}$ for the threshold discontinuity angle $\theta_{DT1}$. As shown, data from cluster 500c is within the threshold discontinuity angle $\theta_{DT1}$. Therefore, there is an insufficient discontinuity following cluster 500b. In one or more arrangements, responsive to determining that data from any of the one or more clusters in the point cloud (in this case, data from cluster 500c) is within the threshold discontinuity angle $\theta_{DT1}$, the point cloud analysis module 128 can maintain the current position of the starting ray $R_{St}$. Further, the point cloud analysis module 128 can monitor the angle between the current ray $R_C$ and the starting ray $R_{St}$ while continuing to analyze the point cloud data as subsequent point cloud data is received.

In some arrangements, the point clustering module 127 can determine whether the perceived end of a cluster is the actual end of the cluster. Continuing with the example shown in FIG. 5, the point clustering module 127 can determine whether one or more points beyond the cluster 500b should be grouped (or clustered) with cluster 500b or another cluster (e.g., 500c). The point clustering module 127 can identify which cluster one or more points beyond the cluster 500b should be grouped with based on one or more factors, including for example, a space (or angle) between adjacent points, the respective distances of adjacent points to the LIDAR sensor(s) 120, etc. In some examples, the point clustering module 127 can compare the space, angle, respective distance, etc. between adjacent points in the point cloud to a threshold space, angle, distance, etc. When the space, angle, distance, etc. exceeds (or is equal to) the threshold, the point clustering module 127 can determine that the point(s) beyond the cluster 500b should be grouped with a separate cluster. In this regard, the point clustering module 127 can refine one or more clusters as subsequent data is received and analyzed on a rolling basis.

It should be noted that, in the view shown in FIGS. 4-5, each ray emitted by the LIDAR sensor(s) includes a plurality of rays within a substantially vertical plane (e.g., into and out of the page in FIGS. 4-5). Based on the size, location, and/or arrangement of objects in the external environment of the vehicle and/or due to the arrangement of the plurality of rays, the plurality of rays within a substantially vertical plane may detect different objects. For example, one or more of the plurality of rays can detect a shorter nearby object and one or more of the plurality of rays can detect a taller, more distant object. Thus, it will be appreciated that the above-mentioned space, angle, respective distance, etc. between adjacent points in the point cloud can refer to adjacent points within the same substantially vertical plane and/or to points in adjacent rays in a clockwise or counterclockwise direction.

The point cloud analysis module 128 can continue to move the current ray $R_C$ in a clockwise direction along the next cluster 500c as additional point cloud data is received. The point cloud analysis module 128 can identify and mark the perceived end of the cluster 500c with an end ray $R_{E2}$. The point cloud analysis module 128 can continue to move the current ray $R_C$ in a clockwise direction again. The point cloud analysis module 128 can monitor data following the perceived end of the cluster 500c for the threshold discontinuity angle $\theta_{DT2}$. As shown, data from cluster 500d is located within the threshold discontinuity angle $\theta_{DT2}$. In this example, there is no discontinuity following cluster 500c. As a result, data from cluster 500c is not published. The point cloud analysis module 128 can repeat the same analysis for cluster 500d.

The point cloud analysis module 128 can monitor the current angle $\theta_C$, which, as previously stated, extends from the starting ray $R_{St}$ at the start of cluster 500b to the current ray $R_C$. The point cloud analysis module 128 can compare the current angle $\theta_C$ to a publishing threshold angle $\theta_{PT}$. In the example shown in FIG. 5, the publishing threshold angle $\theta_{PT}$ is 180°. It should be understood that other publishing threshold angles $\theta_{PT}$ may be used, including but not limited to 45°, 60°, 90°, 120°, etc. Further, these examples of the publishing threshold angles $\theta_{PT}$ add up to 360°. However, it will be understood that the publishing threshold angle $\theta_{PT}$ is not limited to angles that add up to 360°. For instance, in some examples, the publishing threshold angle $\theta_{PT}$ may be 80°, 100°, 220°, etc. In these examples, the publishing threshold angle $\theta_{PT}$ may be arranged such that a region of the external environment within the publishing threshold angle $\theta_{PT}$ for a first full rotation of the LIDAR sensor(s) 120 is not the same as a region of the external environment within the publishing threshold angle $\theta_{PT}$ for a subsequent full rotation of the LIDAR sensor(s) 120. As such, one or more objects partially located in (thus partially observable within) the region of the external environment within the publishing threshold angle $\theta_{PT}$ for the first full rotation of the LIDAR sensor(s) 120 may be fully located in (thus fully observable within) the region of the external environment within the publishing threshold angle $\theta_{PT}$ for a subsequent full rotation of the LIDAR sensor(s) 120.

If the current angle $\theta_C$ is greater than (or equal to) the publishing threshold angle $\theta_{PT}$, the point cloud analysis module 128 can determine that one or more clusters from the current angle are to be published. In some examples, the point cloud analysis module 128 can determine that one or more clusters beginning from the starting ray $R_{St}$ and ending prior to the current ray $R_C$ are to be published. In this regard, the point cloud analysis 128 can, in some examples, publish all the cluster data from within the current angle $\theta_C$, and can, in other examples, publish less than all the cluster data from within the current angle $\theta_C$.

The cluster publishing module 129 can communicate one or more clusters from within the current angle $\theta_C$ of the point cloud to various external components. The cluster publishing module 129 can publish an identification of the clusters (e.g., clusters 500b, 500c), data from each of the clusters, a location of each of the clusters, a size of each of the clusters, etc.

In one or more arrangements, the vehicle 100 can include a cluster storage module 130. The cluster storage module 130 can store data from one or more clusters that were not published, but were partially observed or detected. In one or more arrangements, where the point cloud analysis module publishes less than all the cluster data from within the current angle $\theta_C$, the cluster storage module 130 can store data for the non-published clusters. The data stored by the cluster storage module 130 can be carried over to the next publishing cycle. In these examples, the cluster storage module 130 can store data from the clusters that were not published but were detected. In this regard, data from each of the clusters between the start of the first cluster (e.g., the starting ray $R_{St}$) and the current ray $R_C$ will either be published or stored for subsequent publishing. As a result, all data from within the current ray $R_C$ will be published prior to a complete 360° rotation.

In one or more arrangements, the data from the partially stored clusters can be stored on memory 110. In these arrangements, the data can be stored as sensor data 114. The point cloud analysis module 128 can access the sensor data 114 stored on memory to determine whether there are one or more partially observed clusters (such as cluster 500d). If there are one or more partially observed clusters, the point cloud analysis module 128 can combine the sensor data 114 stored on memory 110 with current observations, such that the partially observed clusters will be "complete" when fully observed (e.g., reaching the end of cluster 500d), and will be ready for publishing. The partially observed clusters will be stored and published during the same rotation, and therefore minimal to no distortion of the clusters will result.

Figure 6:
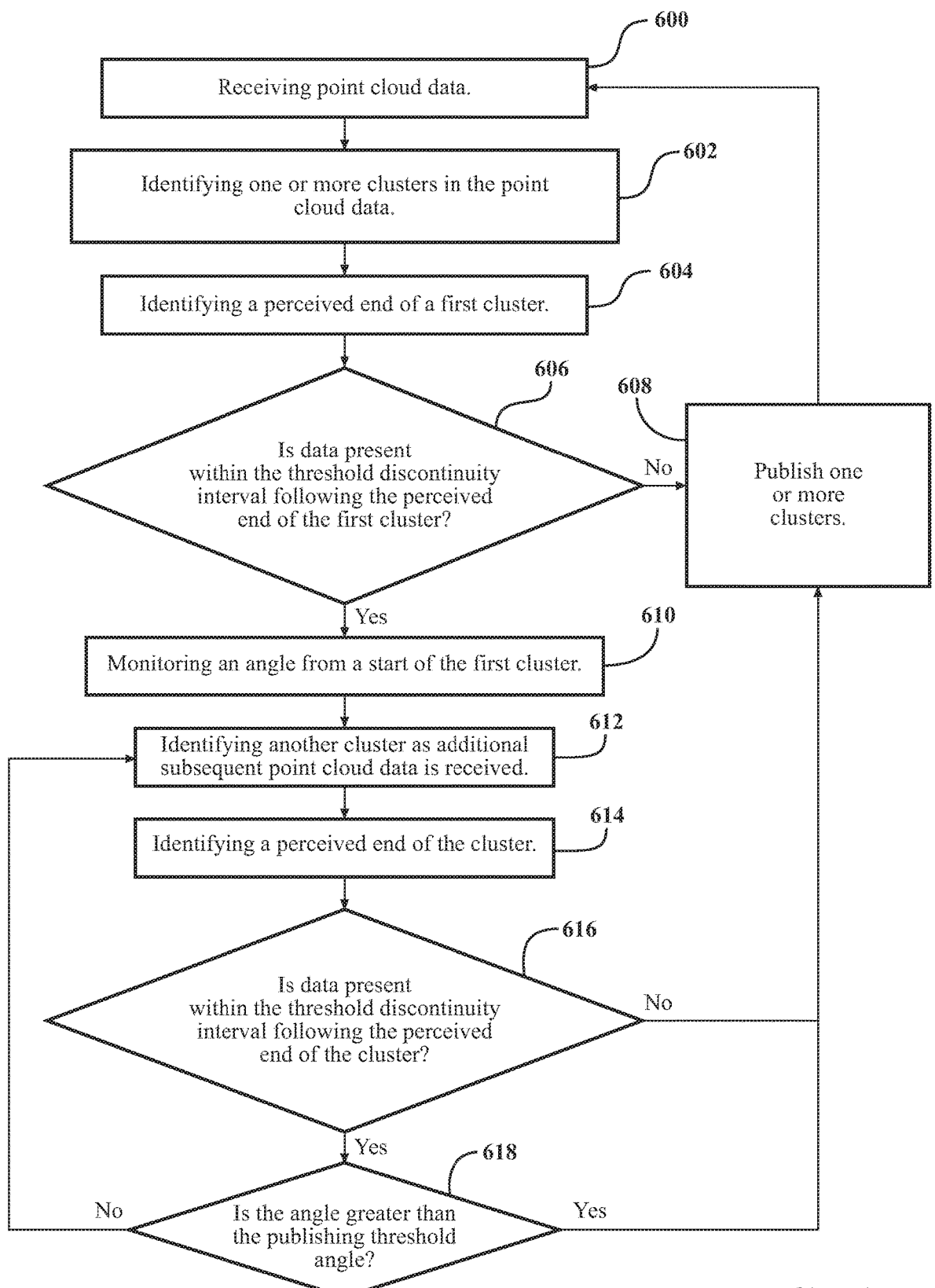
FIG. 6 is an example method of publishing cluster data from a point cloud.

Now a method of publishing cluster data from a point cloud in the vehicle will be described with reference to FIG. 6. The diagram shown in FIG. 6 is only for exemplary purposes. The following disclosure should not be limited to each and every function block shown in FIG. 6. To the contrary, the method does not require each and every function block shown. In some examples, the method can include additional function blocks. Further, the method does not need to be performed in the same chronological order shown in FIG. 6. To the extent possible, reference will be made to the structure described above.

The method can begin at function block 600. At function block 600, the point cloud analysis module 128 can include instructions to receive point cloud data generated by the LIDAR sensor 120 as the LIDAR sensor 120 is rotating. The point cloud data can be representative of the environment surrounding the vehicle 100. For example, each of the points in the point cloud may be data representative of a distance from the LIDAR sensor 120 to a surface in the environment of the vehicle 100. In one or more arrangements, the point cloud generation module 126 can construct a point cloud based on data generated by the LIDAR sensor 120 as the LIDAR sensor 120 rotates. In this example, the point cloud analysis module 128 can use the point cloud generated via the point cloud generation module 126. In one or more arrangements, the point cloud data can continue to be received throughout the disclosed method as it is generated. The method can continue to function block 602.

At function block 602, the point cloud analysis module 128 can include instructions to identify one or more clusters in the point cloud data. In one or more arrangements, each of the one or more clusters may be representative of at least one object surrounding the vehicle 100. For example, the clusters 300a-c shown in FIG. 3 may be representative of vehicles 205-215 in FIG. 2. In one or more arrangements, the point clustering module 127 can group one or more data points in the point cloud to form a cluster. The clusters can be grouped such that similar data from at least one object are grouped together. In this example, the point cloud analysis module 128 can identify clusters that are formed via the point clustering module 127. The method can continue to function block 604.

At function block 604, the point cloud analysis module 128 can include instructions to identify a perceived end of a first cluster of the one or more clusters. In one or more arrangements, the perceived end can be an outermost data point of the cluster in the direction of rotation of the LIDAR sensor 120. In some examples, the perceived end of the cluster may be an actual end of the cluster (e.g., there will be no additional data points as subsequent point cloud data is received). In other examples, the perceived end of the cluster may not be the actual end of the cluster (e.g., data may be present following the perceived end of the cluster). The method can continue to decision block 606.

At decision block 606, the point cloud analysis module 128 can include instructions to determine whether data from any of the one or more clusters (including but not limited to the first cluster) is present within a threshold discontinuity interval following the perceived end of the first cluster as subsequent point cloud data is received. As previously stated, the threshold discontinuity interval may be an angle, a space, a duration of time, a degree of rotation, etc. from the perceived end of the first cluster. In some examples, the threshold discontinuity interval can be a fixed interval (e.g., a fixed angle for all clusters). In other examples, the threshold discontinuity interval can be a function of a distance between the perceived end of the first cluster and the LIDAR sensor 120. When the threshold discontinuity interval is a function of the distance between the perceived end of the first cluster and the LIDAR sensor 120, the threshold discontinuity interval can decrease as the distance to the perceived end of the cluster increases.

If, at decision block 606, there is no data present from any of the one or more clusters within the threshold discontinuity interval following the perceived end of the first cluster, the method can continue to function block 608. At function block 608, the cluster publishing module 129 can include instructions to publish data for at least the first cluster. In one or more arrangements, the point cloud analysis module 128 can identify the first cluster as ready for publishing, and the cluster publishing module 129 can publish at least the first cluster. However, if, at decision block 606, there is data present from any of the one or more clusters within the threshold discontinuity interval following the perceived end of the first cluster, the method can continue to function block 610.

At function block 610, the point cloud analysis module 128 can include instructions to monitor an angle from a start of the first cluster. The start of the first cluster can be a first data point for the cluster in the direction of rotation of the LIDAR sensor 120. Therefore, the start of the cluster may be on an opposite end of the perceived end of the same cluster. The angle may be between the start of the first cluster and a current ray. The angle being monitored at function block 610 is referred to as the current angle. As will be discussed in greater detail below, the point cloud analysis module 128 can monitor the current angle from the start of the first cluster while performing the steps represented by function blocks 612-618. The method can continue to function block 612.

At function block 612, the point cloud analysis module 128 can include instructions to identify another cluster as additional subsequent point cloud data is received. Function block 612 can be the same (or similar) to the step performed at function block 602. The method can continue to function block 614.

At function block 614, the point cloud analysis module 128 can include instructions to identify a perceived end of the cluster identified in function block 612. Function block 614 can be the same (or similar) to the step performed at function block 604. The method can continue to decision block 616.

At decision block 616, the point cloud analysis module 128 can include instructions to determine whether data from any of the one or more clusters (including but not limited to the cluster detected at function block 612) is present within a threshold discontinuity interval following the perceived end of the cluster as subsequent point cloud data is received. Decision block 616 can be the same (or similar) to the step performed at decision block 606.

If data from any of the one or more clusters is present within the threshold discontinuity interval, the method can continue to decision block 618. At decision block 618, the point cloud analysis module 128 can compare the angle being monitored at function block 610 to a publishing threshold angle. If the angle being monitored at function block 610 is greater than the publishing threshold angle, the method can return back to function block 608, and the point cloud analysis module 128 can identify one or more clusters to be published.

In some examples, the point cloud analysis module 128 can determine that one or more clusters beginning from the start of the first cluster and ending prior to the current ray are to be published. In this regard, the clusters that will be published are from an area of the point cloud that is less than the current angle. In some examples, the point cloud analysis module 128 can publish all the cluster data from within the current angle $\theta_C$.

At function block 608, the cluster publishing module 129 can communicate one or more clusters from within the current angle of the point cloud to various external components. The cluster publishing module 129 can publish an identification of the clusters, data from each of the clusters, a location of each of the clusters, a size of each of the clusters, etc.

In one or more arrangements, the cluster storage module 130 can store data from one or more clusters that were not published, but were partially observed or detected. The data from the partially observed clusters may be carried over to a subsequent current angle to be published, at least, upon complete observation of the cluster. In some examples, the cluster storage module 130 can determine which clusters were not published at function block 608, but were detected. In these examples, the cluster storage module 130 can store data from the clusters that were not published but were detected. In this regard, data from each of the clusters between the start of the first cluster and the current ray will either be published or stored for subsequent publishing, depending on whether the clusters are determined to be "complete", or fully observed.

When, at decision block 618, the angle is less than the publishing threshold angle, the method can continue back to function block 612. In this regard, the point cloud analysis module 128 will continue through function blocks 612-618 until either there is no data for the threshold discontinuity angle following a perceived end of a cluster, or the angle being monitored at function block 610 is greater than the publishing threshold angle. When one of those two conditions are met, the method can continue back to function block 600.

It will be appreciated that arrangements described herein can provide numerous benefits, including one or more of the benefits mentioned herein. For example, arrangements described herein can improve the speed at which cluster data is published to other components of the vehicle. Arrangements described herein can expedite publishing of point cloud data by publishing point cloud data on a rolling, intermediate, or intermittent basis, rather than waiting for a full 360° rotation to publish the point cloud data. Arrangements described herein can eliminate and/or mitigate the likelihood of distortion of cluster data. Arrangements described herein can improve the reliability of the cluster data.

Detailed examples are disclosed herein. However, it is to be understood that the disclosed examples are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various examples are shown in FIGS. 1-6, but the examples are not limited to the illustrated structure or application.

The flowcharts and block diagrams in the figures illustrate the architecture, functionality, and operation of possible implementations of systems, methods and computer program products according to various examples. In this regard, each block in the flowcharts or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . ." as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for publishing cluster data in a vehicle, the system comprising:
   a LIDAR sensor configured to rotate 360 degrees about an axis of rotation;
   one or more processors operatively connected to the LIDAR sensor; and
   memory operatively connected to the one or more processors, the memory storing instructions that, when executed by the one or more processors, cause the one or more processors to:
      identify one or more clusters based on data received from the LIDAR sensor, the identified one or more clusters being representative of at least one object in an external environment of the vehicle; and
      publish the identified one or more clusters before the LIDAR sensor completes a full 360 degree rotation about the axis of rotation by:
         identifying a perceived end of a first cluster of the one or more clusters;
         determining whether data from any of the one or more clusters is present within a threshold discontinuity interval following the perceived end of the first cluster as subsequent data is received from the LIDAR sensor; and
         publishing at least the first cluster if no data from the one or more clusters is present within the threshold discontinuity interval.

2. The system of claim 1, wherein identify one or more clusters based on data from the LIDAR sensor comprises:
   receive point cloud data as the LIDAR sensor is rotating about the axis of rotation; and
   identify one or more clusters in the point cloud data.

3. The system of claim 1, wherein the memory further includes instructions that, when executed by the one or more processors, cause the one or more processors to refrain from publishing at least the first cluster responsive to data from the one or more clusters being present within the threshold discontinuity interval.

4. The system of claim 1, wherein the memory further includes instructions that, when executed by the one or more processors, cause the one or more processors to:

monitor an angle from a start of the first cluster responsive to data from the one or more clusters being present within the threshold discontinuity interval while the one or more processors:
identify a second cluster as subsequent data is received from the LIDAR sensor;
identify a perceived end of the second cluster;
determine whether data from any of the one or more clusters is present within a threshold discontinuity interval following the perceived end of the second cluster; and
if no data from the one or more clusters is present within the threshold discontinuity interval, publish at least the first and second cluster before the LIDAR sensor completes a full 360 degree rotation about the axis of rotation.

5. The system of claim 4, wherein the memory further includes instructions that, when executed by the one or more processors, cause the one or more processors to:
compare the angle from the start of the first cluster to a publishing threshold angle; and
publish at least one cluster from within the angle responsive to the angle being greater than the publishing threshold angle.

6. The system of claim 5, the memory further includes instructions that, when executed by the one or more processors, cause the one or more processors to:
store data from the LIDAR sensor that was not published, the stored data being published before the LIDAR sensor completes a full 360 degree rotation about the axis of rotation.

7. The system of claim 1, wherein the memory further includes instructions that, when executed by the one or more processors, cause the one or more processors to:
determine one or more maneuvers for the vehicle to execute based at least in part on the published one or more clusters; and
generate one or more control signals to cause the vehicle to execute the one or more maneuvers.

8. A system for publishing cluster data in a vehicle, the system comprising:
a LIDAR sensor rotating about an axis of rotation, the LIDAR sensor transmitting a signal and generating data responsive to detecting the transmitted signal reflected off a surface;
one or more processors communicably coupled to the LIDAR sensor; and
memory communicably coupled to the one or more processors, the memory storing instructions that, when executed by the one or more processors, cause the one or more processors to:
receive point cloud data generated by the LIDAR sensor as the LIDAR sensor is rotating;
identify one or more clusters in the point cloud data, the identified one or more clusters being representative of at least one object in an external environment of the vehicle;
identify a perceived end of a first cluster of the one or more clusters;
determine whether data from any of the one or more clusters is present within a threshold discontinuity interval following the perceived end of the first cluster as subsequent point cloud data is received;
publish at least the first cluster if no data from the one or more clusters is present within the threshold discontinuity interval; and
refrain from publishing at least the first cluster if data from the one or more clusters is present within the threshold discontinuity interval.

9. The system of claim 8, wherein the memory further includes instructions that, when executed by the one or more processors, cause the one or more processors to:
monitor an angle from a start of the first cluster responsive to data from the one or more clusters being present within the threshold discontinuity interval while the one or more processors:
identify a second cluster as subsequent point cloud data is received;
identify a perceived end of the second cluster;
determine whether data from any of the one or more clusters is present within a threshold discontinuity interval following the perceived end of the second cluster; and
if no data from the one or more clusters is present within the threshold discontinuity interval, publish at least the first and second cluster prior to a full rotation of the LIDAR sensor.

10. The system of claim 9, wherein the memory further includes instructions that, when executed by the one or more processors, cause the one or more processors to:
compare the angle from the start of the first cluster to a publishing threshold angle; and
publish at least one cluster from within the angle responsive to the angle being greater than the publishing threshold angle.

11. The system of claim 10, wherein the memory further includes instructions that, when executed by the one or more processors, cause the one or more processors to:
store data from the point cloud that was not published, the stored data being published prior to a complete 360° rotation of the LIDAR sensor.

12. The system of claim 8, wherein the memory further includes instructions that, when executed by the one or more processors, cause the one or more processors to:
determine one or more maneuvers for the vehicle to execute based at least in part on the published first cluster; and
generate one or more control signals to cause the vehicle to execute the one or more maneuvers.

13. A method of publishing cluster data in a vehicle, the method comprising:
identifying one or more clusters based on data from a LIDAR sensor as the LIDAR sensor rotates about an axis of rotation, the identified one or more clusters being representative of at least one object in an external environment of the vehicle; and
publishing the identified one or more clusters before the LIDAR sensor completes a full 360 degree rotation about the axis of rotation by:
identifying a perceived end of a first cluster of the one or more clusters;
determining whether data from any of the one or more clusters is present within a threshold discontinuity interval following the perceived end of the first cluster as subsequent data is received from the LIDAR sensor; and
publishing at least the first cluster if no data from the one or more clusters is present within the threshold discontinuity interval.

14. The method of claim 13, further comprising:
if data from the one or more clusters is present within the threshold discontinuity interval, not publishing at least the first cluster.

15. The method of claim 13, further comprising:
if data from any of the one or more clusters is present within the threshold discontinuity interval, monitoring an angle from a start of the first cluster while performing the following:
   identifying a second cluster as subsequent point cloud data is received;
   identifying a perceived end of the second cluster;
   determining whether data from any of the one or more clusters is present within a threshold discontinuity interval following the perceived end of the second cluster; and
   if no data from the one or more clusters is present within the threshold discontinuity interval, publishing at least the first and second cluster prior to a full rotation of the LIDAR sensor.

16. The method of claim 15, further comprising:
comparing the angle to a publishing threshold angle; and
publishing at least one cluster from within the angle responsive to the angle being greater than the publishing threshold angle.

17. The method of claim 16, wherein the threshold discontinuity interval is a fixed angle.

18. The method of claim 16, wherein a size of the threshold discontinuity interval is a function of a distance to the perceived end of the first cluster.

* * * * *